United States Patent [19]

Hoshino

[11] Patent Number: 4,747,569
[45] Date of Patent: May 31, 1988

[54] SUPPORT HEAD FOR A MUSICAL INSTRUMENT HOLDER OR THE LIKE

[75] Inventor: Yoshihiro Hoshino, Nagoya, Japan
[73] Assignee: Hoshino Gakki Co., Ltd., Japan
[21] Appl. No.: 72,555
[22] Filed: Jul. 13, 1987
[51] Int. Cl.[4] ............................................. E04G 3/00
[52] U.S. Cl. .................................. 248/286; 248/184; 248/187; 248/220.2; 403/97; 269/76; 84/421
[58] Field of Search ............ 248/286, 284, 220.2, 248/222.2, 222.3, 121, 130, 185, 316, 229, 178, 183, 184, 187; 403/97, 146, 55; 269/71, 76, 73, 254 R, 254 CS; 84/421

[56] References Cited

U.S. PATENT DOCUMENTS

| | | | |
|---|---|---|---|
| 1,177,638 | 4/1916 | Larson et al. | 403/97 |
| 1,706,215 | 3/1929 | Davidson | 403/97 |
| 4,018,412 | 4/1977 | Kees et al. | 248/286 X |
| 4,453,446 | 6/1984 | Hoshino | 84/421 |
| 4,547,092 | 10/1985 | Vetter et al. | 403/97 X |
| 4,640,175 | 2/1987 | Hoshino | 248/286 X |

FOREIGN PATENT DOCUMENTS 53-45613 1/1978 Japan .
54596 11/1983 Taiwan .

Primary Examiner—Ramon O. Ramirez
Attorney, Agent, or Firm—Ostrolenk, Faber, Gerb & Soffen

[57] ABSTRACT

A support head for a support rod which enables the angular orientation and the longitudinal position of the rod to be adjusted with respect to the support head. The support head includes a main body supported on a stand, an intermediate member and beyond the intermediate member a finishing member. The main body and intermediate member have facing annular ridged racks which when engaged prohibit relative rotation therebetween. A screw connection between the main body and the intermediate member is tightened to prohibit rotation and is loosened to permit it. The intermediate member and a finishing member beyond it have respective cooperating recesses which together define an opening through which the support rod is passed and is longitudinally movable. A second screw connection between the finishing member and the intermediate member is tightened to clamp the rod in the recesses and is loosened to permit the rod to be shifted longitudinally.

14 Claims, 2 Drawing Sheets

SUPPORT HEAD FOR A MUSICAL INSTRUMENT HOLDER OR THE LIKE

BACKGROUND OF THE INVENTION

The present invention relates to a support head for supporting a rod, useful for example as a musical instrument holder, which enables adjustment of the rod both angularly and longitudinally in order to optimally position the supported instrument.

With musical instruments, for instance drums, it is often desirable to support the instrument in such a position that it may be readily accessible to the user. It is necessary to orient the musical instrument to facilitate its use and grasping, holding or removal from the support and to provide appropriate adjustment of the the instrument both angularly around the support and toward and away from it.

Various devices have been used, such as a ball in a socket having universal characteristics of rotation in conjunction with a sliding clamp which can position a musical instrument on a rod with respect to the ball. In known holders, the adjustment for angular position and the adjustment for the length of the instrument supported by the device have been placed at different locations on the support which can interfere with the rapid adjustment of the supporting device.

BRIEF DESCRIPTION OF THE PRESENT INVENTION

It is an object of the invention to provide a support head for a support rod which may be supported on a base and positions a holding rod both along its length and at a selected angular position.

The support head of the present invention holds a support rod which is adjustable along its length in the head and the angular orientation of which is adjustable. The support head includes a main body which may be supported on a stand. It includes an intermediate member which is adjacent the main body. The main body and intermediate members have facing sides which carry respective engaging means which engage to prevent relative rotation. For example, those engaging means may each comprise a radially ridged, annular rack. A first attaching means selectively moves the main body and intermediate members together or permits them to be moved apart. A spring between them normally urges them apart.

The head also includes a finishing member beyond the intermediate member. Each of the intermediate member and the finishing member has a respective recess defined in it, and the recesses face toward each other and together define an opening through which the support rod is passed. There are second connecting means between the intermediate member and the finishing member for being tightened to draw those members together and clamp the rod in the recesses defining the opening and for being loosened to permit the intermediate member and finishing member to be moved apart by a biasing spring to release the rod. Loosening of the first attaching means permits the angular orientation of the rod to be adjusted. Loosening of the second connecting means permits the longitudinal position of the rod to be adjusted. Both the first attaching means and the second connecting means may be respective screws which pass through the main body and through the finishing member and are screw threadedly received in threaded bores in the intermediate member.

BRIEF DESCRIPTION OF THE DRAWINGS

The foregoing and many other objects of the present invention will become apparent in the following description and drawings in which.

DETAILED DESCRIPTION OF THE INVENTION

Figure 1:
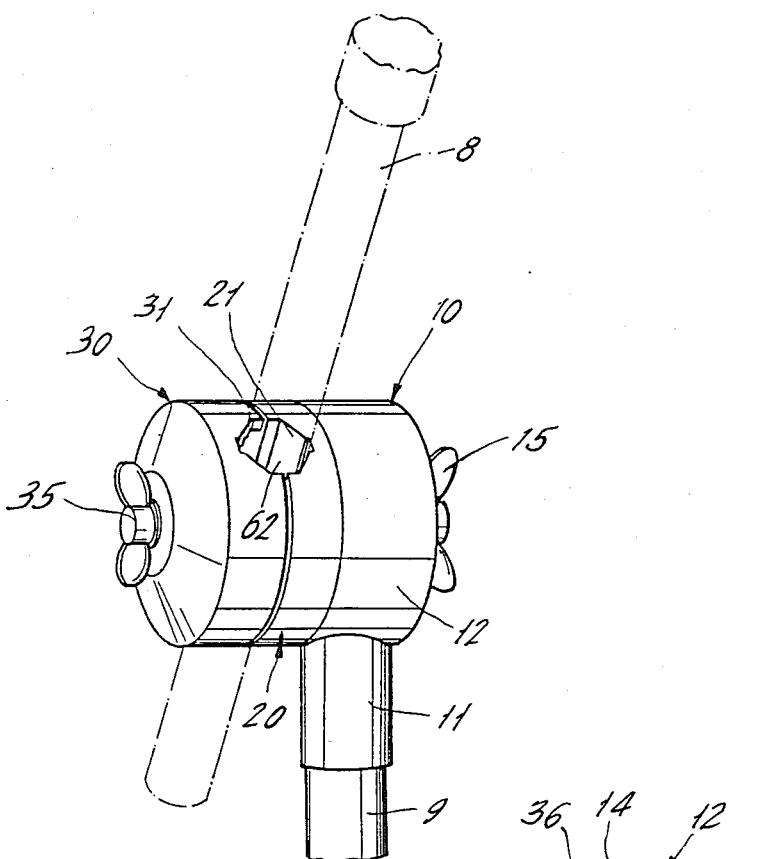
FIG. 1 is a view in perspective partially in phantom of the support head of the present invention.
Figure 4:
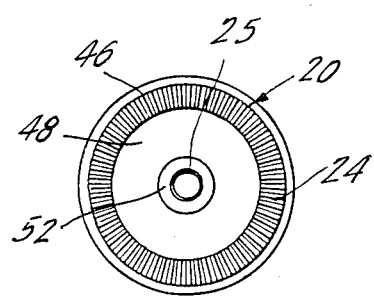
FIG. 4 is an end view of the intermediate section 20 of the fixing unit of FIGS. 1 and 2.
Figure 2:
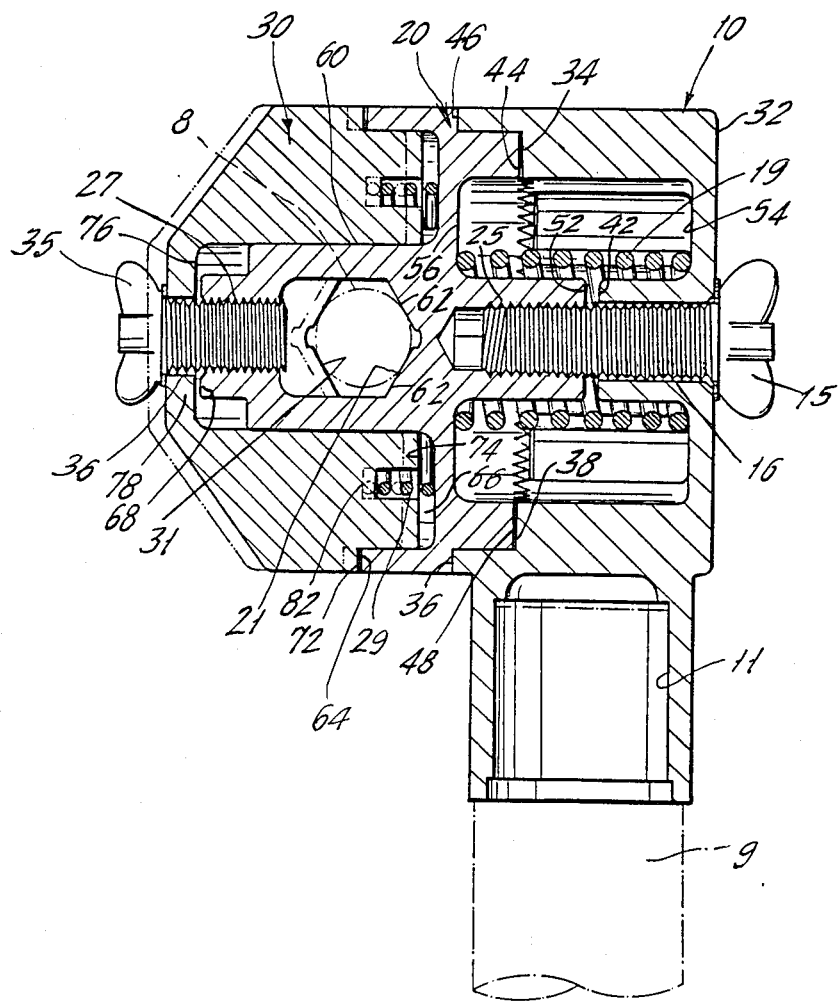
FIG. 2 is a vertical cross-sectional view of the support head of FIG. 1.

Referring first to FIGS. 1 and 2, a support head 10 for supporting an instrument, or the like, includes a main body 12, which is substantially cylindrical in shape with a horizontal axis. Projecting beneath the body 12 is a tube-shaped installation portion 11 into which a support rod may be inserted to connect with an appropriate stand for the entire support head 10. The main body 12 has an external side 32 and an internal side 34. The side 34 is profiled to include a forward facing annular ridge 36, a main front face 38 and a depressed surface 42. A smooth walled opening 16 sized to the diameter of screw 15 extends through the body 12 from the side 32 to the depressed surface 42.

A first attaching screw 15 is passed into the opening 16 and projects through the depressed surface.

Figure 3:
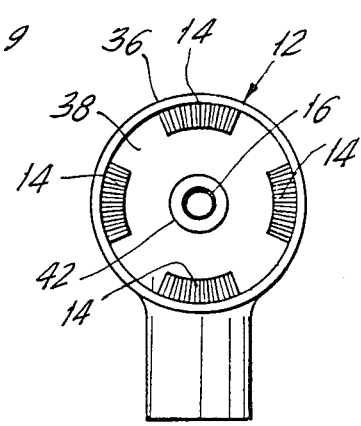
FIG. 3 is an end view of the interior portion of the support head 10 of the support unit of FIGS. 1 and 2.

As seen in FIG. 3, there are formed at equally spaced locations around front face 38 four arcuate segment shaped, convex-concave ridge radially extending engagement and locking strips 14 which cooperate with the below-described intermediate member 20 for maintaining member 20 in a fixed rotative orientation.

Adjacent and engageable with the main body 12 is a correspondingly cylindrically externally profiled intermediate member 20 coaxial with the main body 12. The intermediate member can be rotated with respect to the main body 12 but is also securable thereto to halt the rotation at any selected orientation.

The rear facing side 44 of intermediate member 20 is profiled to mate with the front internal side of support body 12, and the side 44 includes therefor a peripheral recess 46, a main surface 48 and a rearward projecting surface 52.

The rear side 44 of the intermediate member 20 is provided with a complete annular array of radially extending convex-concave ridges which are shaped and placed to cooperate with the arcuate segments 14 on the main body 12, at whatever relative rotative orientation is established between the body 12 and member 20.

The intermediate member 25 has a screw threaded hole 27 at its rear side which aligns with the hole 16 through the main body 12 and which receives the end of the threaded screw 15 which projects through the front surface 42 of the main body 12. Tightening of the screw 15 in threaded hole 27 draws the body 12 and member 20 together, draws the ridged annular surface 24 against the ridged sections 14 and prohibits relative rotation between the member 20 and the body 12 once their desired rotative orientation has been established. Loosening of the screw 15 separates body 12 and member 20 which thereafter enables rotation of the member 20 to any rotative orientation.

There is also a depressed region 54 in the front of the body 12 and a corresponding depressed region 56 in the rear of the member 20 which together receive the coiled compression spring 19 which normally urges the body 12 and member 20 apart and against the tightening of the screw 15. This insures that there is no undesired compliance between the body and member and insures a firm engagement between them.

The intermediate member 20 has a forwardly projecting, small diameter, cylindrical nose 60 through which there is a polygonal transverse opening 21 for receiving the support rod 8 for a musical instrument. As can be seen in FIG. 2, the polygonal opening 21 has only two inclined surfaces 62, which engage the rod 8. The surfaces at the other end of the opening 21 are removed a distance from the surfaces 62 and would not contact the rod 8. In FIG. 1, it can be seen that at the surfaces 62, the member 20 widens so that the surfaces 62 extend out to the periphery of the member 20.

The forward or outward facing side of the intermediate member 20 also is profiled to include the forwardly projecting, annular, peripheral rim 64, the depressed annular surface 66, and the forwardly projecting nose 60 has an annular periphery and has a forwardly facing surface 68.

There is an outside finishing member 30 which cooperates with the intermediate member 20 to support the support rod 8. The rear side of the member 30 is profiled complementary to the forward side of the member 20, so that the member 30 has a rearwardly facing peripheral depression 72, a rearwardly projecting surface 74 inward of the periphery, and a deep depression 76 into which the nose 60 of the intermediate member 20 can project. The finishing member 30 is annular around the nose 60.

There is a rod holding polygonal recess 31 at the rearwardly facing side of the finishing member 30. As can be seen, particularly in FIG. 1, the polygonal recess 31 and the polygonal recess 21 together cooperate to define a polygonal opening 21, 31 for supporting the rod 8 which passes through the polygonal opening. The recesses 21 and 31 are aligned parallel next to each other. There is an unthreaded opening 36 through the front portion 78 of the finishing member 30. Aligned with that is the threaded opening 27 in the nose 60 of the intermediate member 20. A second tightening screw 35 is passed through the opening 36 and tightened into the threaded opening 27. The tightening of the screw 35 moves the intermediate member 20 toward or away from the finishing member 30 and that also moves the polygonal wall 21 toward and away from the polygonal wall 31. Tightening the screw 35 pulls the intermediate member toward the finishing member 30 to securely clamp the rod 8, while loosening the screw 35 moves those members apart sufficiently to loosen the grip upon the support rod. A compression spring 29 disposed between the forwardly facing surface 66 of the intermediate member 20 and a blind hole 82 in the rearwardly facing side 74 of the finishing member normally urges the finishing member 30 and intermediate member 20 apart, such that the tightening of the screw 35 clamps the support rod 8 and avoids compliance.

The polygonal recesses 21, 31 each is a generally V-shaped notch which engages the support rod.

The musical instrument holder of the present invention is installed on the stand 9 by means of the installation member 11. The first tightening screw 15 is loosened, which permits rotation of the intermediate member 20 together with the attached outside member 30 with respect to the main body 12 to a desired angular position for the support rod 8. Then the first tightening screw 15 is tightened and by the cooperation of the radial ridge groupings 14, 24, rotation of the members 20, 30 with respect to the body 12 is thereafter prevented. The fine, narrowly spaced ridges permit quite fine adjustments in the angular orientation of the rod 8.

Thereafter, the longitudinal position of the rod 8 may be adjusted by loosening the adjustment screw 35, moving the rod 8 longitudinally and then tightening the adjustment screw 35.

All of the adjustments are made at the support head itself, and the adjustments are easily made at its opposite ends. The front-to-back thickness of that support head is small enough that both screws can be easily reached for appropriate adjustments.

Although the present invention has been described in connection with a preferred embodiment thereof, other variations and modifications will now become apparent to those skilled in the art. It is preferred, therefore, that the present invention be limited not by the specific disclosure herein, but only by the appended claims.

What is claimed is:

1. A support head for a support rod, comprising:

a main body, an intermediate member adjacent the main body and a finishing member adjacent the intermediate member; the main body and intermediate members having respective facing first sides; first engaging means on the facing first sides for preventing relative rotation of the intermediate member with respect to the main body when the main body and intermediate member have been moved together to bring the first engaging means into engagement;

first attaching means between the main body and the intermediate member for supporting the intermediate member to enable relative rotation of the intermediate member with respect to the main body when the first engaging means are out of engagement and for drawing the main body and the intermediate member together for bringing the first engaging means into engagement and prohibiting further relative rotation of the main body with respect to the intermediate member;

the intermediate member having a first rod holding recess facing the finishing member; the finishing member having a second recess placed for cooperating with the first recess of the intermediate member, such that together the first and second recesses define an opening for receiving the support rod therein;

second means for connecting the intermediate member and the finishing member for drawing the finishing member toward the intermediate member, thereby to draw the first and second recesses together for clamping the support rod in the opening defined by the cooperating recesses, and for enabling the intermediate member and the finishing member to be moved apart for moving the recesses apart for releasing the grip upon the support rod; the support rod being longitudinally movable in the opening defined in the first and second recesses and being movable through the opening generally across the axis of rotation of the intermediate member with respect to the main body.

2. The support head of claim 1, wherein the first attaching means comprises a screw which engages the main body and is threadedly received in the intermediate member for being tightened for drawing the main body and intermediate member together and loosened for permitting the main body and intermediate members to separate.

3. The support head of claim 2, wherein the second connecting means comprises a screw which engages the finishing member and is threadedly received in the intermediate member for being tightened to draw the intermediate and finishing members together and loosened to permit the intermediate and finishing members to be moved apart.

4. The support head of claim 1, wherein the second connecting means comprises a screw which engages the finishing member and is threadedly received in the intermediate member for being tightened to draw the intermediate and finishing members together and loosened to permit the intermediate and finishing members to be moved apart.

5. The support head of claim 2, further comprising a spring normally biasing the main body and intermediate members apart.

6. The support head of claim 4, further comprising a spring normally biasing the intermediate member and the finishing members apart.

7. The support head of claim 5, further comprising a first spring for biasing the main body and intermediate members apart and a second spring for normally biasing the intermediate member and the finishing member apart.

8. The support head of claim 1, wherein the first means for preventing relative rotation of the main body and intermediate member comprises a cooperating first set of radially extending ridges and grooves on the main body and facing toward the intermediate member and a second set of radially extending ridges and grooves on the intermediate member and facing toward the first set of ridges and grooves, for the first and second sets of ridges and grooves to be brought into engagement for preventing relative rotation of the intermediate member and the main body.

9. The support head of claim 1, further comprising support means attached to the holder for supporting the holder to a stand.

10. The support head of claim 9, wherein the support means is attached to and extends radially away from the main body.

11. The support head of claim 1, wherein each of the first and second recesses is generally polygonal in shape and together define the opening of a shape to engage the rod which passes therethrough.

12. The support head of claim 1, wherein the recesses are polygonal in shape and are oriented to cause the opening for the support rod to extend transversely to the axis of rotation of the intermediate member with respect to the main body.

13. The support head of claim 2, wherein the screw for connecting the main body and the intermediate member defines an axis of rotation of the intermediate member with respect to the main body.

14. The support head of claim 3, wherein the screw for connecting the main body and the intermediate member defines an axis of rotation of the intermediate member with respect to the main body; the first and second screws being coaxially aligned.

* * * * *